(12) United States Patent
Huang (10) Patent No.: US 11,056,028 B2
(45) Date of Patent: Jul. 6, 2021

(54) METHOD FOR DETECTING LUMINANCE UNIFORMITY OF SCREEN, STORAGE MEDIUM, AND ELECTRONIC DEVICE (71) Applicant: SHANGHAI HARVEST INTELLIGENCE TECHNOLOGY CO., LTD, Shanghai (CN)

(72) Inventor: Jiandong Huang, Shanghai (CN)

(*) Notice: Subject to any disclaimer, the term of this patent is extended or adjusted under 35 U.S.C. 154(b) by 0 days.

(21) Appl. No.: 16/699,748

(22) Filed: Dec. 2, 2019

(65) Prior Publication Data
US 2020/0175902 A1 Jun. 4, 2020

(30) Foreign Application Priority Data
Nov. 30, 2018 (CN) .......... 201811456312.8

(51) Int. Cl.
G09G 3/00 (2006.01)
G09G 3/3225 (2016.01)
G06K 9/00 (2006.01)

(52) U.S. Cl.
CPC .......... *G09G 3/006* (2013.01); *G09G 3/3225* (2013.01); *G06K 9/00026* (2013.01); *G09G 2320/0233* (2013.01); *G09G 2360/144* (2013.01); *G09G 2360/147* (2013.01)

(58) Field of Classification Search
CPC ................ G09G 3/006; G09G 3/3225; G09G 2360/144; G09G 2360/147; G09G 2320/0233; G09G 3/3216; G09G 2320/0257; G09G 2360/145; G09G 3/3208; G06K 9/00026; G06K 9/0004
See application file for complete search history.

(56) References Cited

U.S. PATENT DOCUMENTS

| 2012/0280625 | A1* | 11/2012 | Zampini, II | H05B 45/10 315/151 |
| 2015/0103106 | A1* | 4/2015 | Chaji | G09G 3/3225 345/690 |
| 2018/0096187 | A1* | 4/2018 | Kwon | H04M 1/026 |
| 2018/0226045 | A1* | 8/2018 | Sohn | G02F 1/13306 |

* cited by examiner

*Primary Examiner* — Mark W Regn (57) ABSTRACT

A method for detecting luminance uniformity of a screen, storage medium, and electronic device are provided. The method includes the following steps. At least one pixel on a display panel of a screen is lit. Light intensity of the pixel reflected by a non-opaque cover plate is acquired by a photoelectric sensor of the screen. Whether the pixel is uniformly luminous based on the acquired light intensity is determined. In this solution, by adding a photoelectric sensor to the screen, it is convenient to obtain the light condition of the screen, and then it is convenient to obtain whether the pixel is uniformly luminous.

18 Claims, 11 Drawing Sheets

METHOD FOR DETECTING LUMINANCE UNIFORMITY OF SCREEN, STORAGE MEDIUM, AND ELECTRONIC DEVICE

BACKGROUND OF THE INVENTION

Field of the Disclosure

The instant invention relates to the field of screen brightness detection, and more particularly to a method for detecting whether a screen is uniformly luminous, a storage medium, and an electronic device.

Description of Related Art

Figure 1:
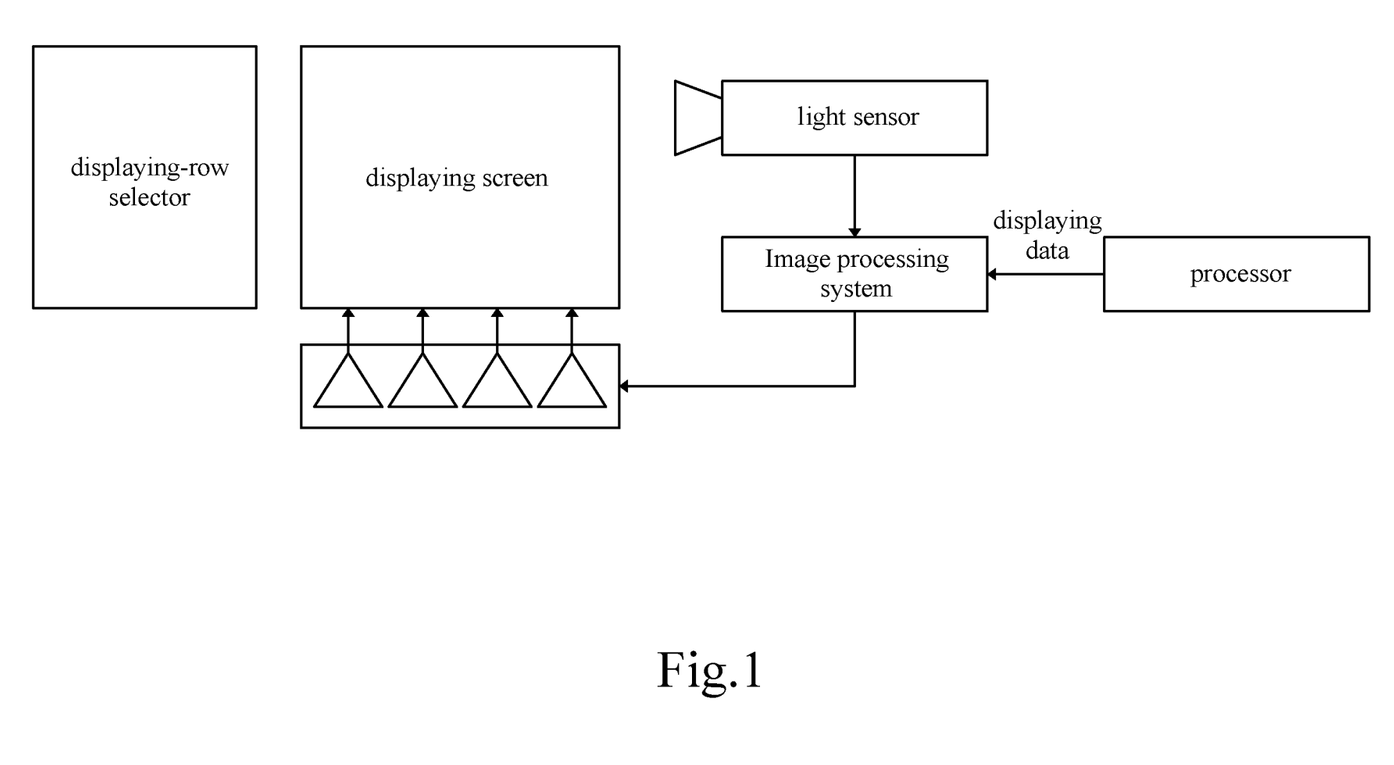
FIG. 1 is a mean of acquiring uniformity of screen illumination by a CCD in the prior art.

OLED (Organic Light-Emitting Diode) as a current-type illuminator has higher self-illumination characteristics, higher contrast than LCD, and also has the advantages of being light and thin, but the brightness uniformity and afterimage are still main problems at present. To solve the problem of brightness uniformity, we must first obtain the illumination uniformity of the screen. Generally, the illumination uniformity is obtained by optical acquisition method at present. As shown in FIG. 1, the optical acquisition method refers to acquiring a luminance signal by illuminating back panel of the screen and photographing it by an optical CCD (Charge Coupled Device). The use of CCD for detection of illumination uniformity requires special equipment, which is costly and can only be tested once before the OLED product delivery. However, when the usage time is long, the OLED will once again face the brightness non-uniformity problem caused by the inconsistent degradation of each pixel. At this time, to solve the brightness non-uniformity problem, the OLED product must only be returned to the manufacturer for maintenance.

SUMMARY OF THE INVENTION

Therefore, it is necessary to provide a method for detecting luminance uniformity of a screen, to solves the inconvenient problem in the existing detection measurement for screen illumination uniformity.

To achieve the above objective, the invention provides a method for detecting luminance uniformity of a screen which comprises steps of:

lighting at least one pixel on a display panel of a screen;

acquiring, by a photoelectric sensor, intensity of light emitted from the pixel that is reflected by a non-opaque cover plate of the screen;

determining whether the pixel is uniformly luminous based on the acquired light intensity.

In addition, the step of determining whether the pixel is uniformly luminous based on the acquired light intensity comprises steps of:

determining whether a difference between the acquired light intensity and a pre-stored original light intensity is within a reasonable range;

if the difference is within the reasonable range, determining the pixel corresponding to the acquired light intensity is uniformly luminous;

otherwise determining the pixel corresponding to the acquired light intensity is not uniformly luminous.

In addition, the step of determining whether the pixel is uniformly luminous based on the acquired light intensity comprises:

determining whether a difference between the acquired light intensity of the pixel and a light intensity of other pixel is within a reasonable range;

if the difference is within the reasonable range, determining the pixel corresponding to the acquired light intensity is uniformly luminous;

otherwise determining the pixel corresponding to the acquired light intensity is not uniformly luminous.

In addition, the step of "lighting at least one pixel on a display panel of a screen" comprises a step of:

driving the pixels on the display panel of the screen to emit light according to a preset pattern.

In addition, the step of "lighting at least one pixel on a display panel of a screen" comprises a step of:

lighting multiple pixels on the display panel of the screen, the multiple pixels are arranged in a spaced array.

In addition, the step of "lighting at least one pixel on a display panel of a screen" comprises a step of:

lighting multiple pixels on the display panel of the screen, some of the multiple pixels are arranged in an aggregated manner.

In addition, the method further comprises a step of:

when it is determined that the pixel is not uniformly luminous based the acquired light intensity, sequentially reducing the number of the multiple pixels that is luminous and acquiring light intensity of the reduced pixels until one pixel that is not uniformly luminous is found.

In addition, the step of "acquiring light intensity of the pixel reflected by a non-opaque cover plate by a photoelectric sensor of the screen" comprises a step of:

using multiple photoelectric sensors corresponding to the lit pixels to acquire the light intensity of the pixels reflected by the non-opaque cover plate of the screen.

In addition, before the step of lighting at least one pixel on the display panel of a screen the method further comprises steps of:

turning off all the pixels on the display panel;

acquiring an ambient light intensity by the photoelectric sensor of the screen;

determining whether the ambient light intensity is larger than a preset value;

lighting at least one pixel on the display panel of the screen if the ambient light intensity is less than or equal to the preset value.

In addition, when the ambient light intensity is larger than the preset value the method further comprises a step of:

driving a prompting unit to send a prompt message of the ambient light being too strong.

In addition, before the step of lighting at least one pixel on the display panel of the screen the method further comprises steps of:

turning off all the pixels on the display panel;

acquiring ambient light intensity by the photoelectric sensor of the screen; and determining whether the pixel is uniformly luminous based on the acquired light intensity comprises steps of:

determining whether the pixel is uniformly luminous by subtracting the ambient light intensity from the acquired light intensity.

In addition, the step of lighting at least one pixel on the display panel of the screen comprises steps of:

acquiring a touched area of a touch screen;

lighting at least one pixel corresponding to the touched area on the display panel of the screen.

In addition, the method further comprises a step of:

When it is determined that the pixel is not uniformly luminous based on the acquired light intensity, changing a driving current or voltage of the pixel according to a preset compensation rule so that the pixel is uniformly luminous.

In addition, the step of changing driving current or voltage of the pixel according to a preset compensation rule so that the pixel is uniformly luminous includes a step of:

changing the driving parameters of the screen to make the pixel illuminate uniformly.

In addition, the step of "when it is determined that the pixel is not uniformly luminous based on the acquired light intensity, changing driving current or voltage of the pixel according to a preset compensation rule so that the pixel is uniformly luminous" comprises:

sending the light intensity to a server;

the server calculating and determining whether the pixel is uniformly luminous based on the light intensity;

the server generating a screen driving parameter according to a preset compensation rule when the server determines that the pixel is not uniformly luminous based on the light intensity;

receiving, from the server, the screen driving parameter to adjust the driving current or voltage of the pixel so that the pixel is uniformly luminous.

In addition, the method further comprises steps of:

placing an object on the non-opaque cover plate;

lighting the pixel of the display panel;

acquiring light of the pixel totally reflected by the non-opaque cover plate by the photoelectric sensor, wherein the display panel and the photoelectric sensor are disposed under the non-opaque cover plate;

shifting position of the pixel to be lit in a preset time interval, repeating the step of lighting the pixel and the step of acquiring the light intensity;

after performing the above steps for a preset number of times, stitching the light intensity acquired by the photoelectric sensor to acquire an image data of the object.

In addition, the pixels are pixels in multiple discrete point light source regions, and the point light source regions are arranged in an array and are separated by non-illuminating pixels;

the step of shifting position of the pixel to be lit comprises a step of performing the same position shift for all point light source regions in a preset time interval.

In addition, the object has biological characteristics.

The invention provides a storage medium and the storage medium stores a computer program and the computer program is executed by a processor to implement the steps of any one of the above-mentioned methods.

The invention provides an electronic device, comprising a memory and a processor. A computer program is stored on the memory, the computer program being executed by the processor to implement the steps of any one of the above-mentioned methods.

Different from the prior art, the above technical solution can conveniently obtain the light condition of the screen by adding a photoelectric sensor to the screen, and then conveniently obtain whether the pixel is uniformly luminous.

BRIEF DESCRIPTION OF THE DRAWINGS

The present invention is further described in detail below with reference to the accompanying drawings and specific embodiments.

DESCRIPTION OF THE INVENTION

Technical contents, structural features, implemented objectives and effects of the present invention will be described in detail below in combination with embodiments and with reference to the accompanying drawings.

Figure 2:
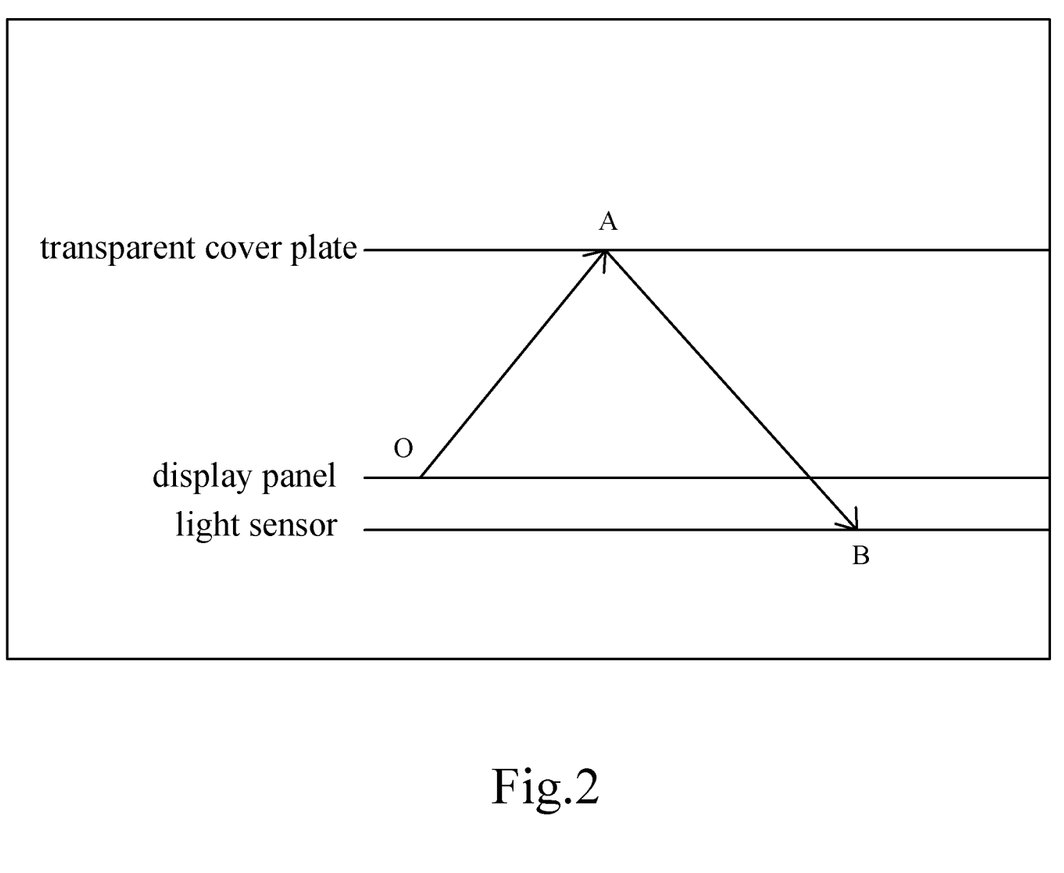
FIG. 2 is a structure of a screen according to the specific embodiment.

Please refer to FIG. 1 to FIG. 12, a method for detecting whether a screen is uniformly luminous is provided in an embodiment. The method of the instant invention is applied to an electronic device having a screen, a photoelectric sensor is disposed under the screen, and a processor in the electronic device performs steps of the method of the invention. As shown in FIG. 2, the screen includes a non-opaque cover plate, a display panel and a photoelectric sensor, and the display panel and the photoelectric sensor are disposed under a non-opaque cover. The non-opaque cover plate is used for transmitting light and protecting the display panel and such as a single-layer structure or a multi-layer structure. The single-layer structure is such as a glass cover plate or an organic non-opaque material cover plate, and the single-layer plate is also such as a cover plate having other functions, for example: a touch screen. The multi-layer structure is such as a multi-layer glass cover plate or a multi-layer organic non-opaque material cover plate or a combination of a glass cover plate and an organic non-opaque material cover plate. The photoelectric sensor is used to acquire the light intensity and includes a plurality of photosensitive units, the photoelectric sensor is such as separately disposed under the display panel or disposed on the display panel. As shown in FIG. 2, when a plurality of photosensitive units is disposed under the display panel and forms a photoelectric sensor panel, and the light can enter the photoelectric sensor through the gap between the pixels on the display panel. When disposed on the display panel, the photosensitive units can be disposed in a gap between the pixels of the display panel. The photoelectric sensor is disposed in the screen for acquiring image, such as image of a fingerprint or palm print. The non-opaque cover plate and the display panel must be connected by filling optical adhesive to avoid the air affecting the reflection of light. The refractive index of the optical adhesive should be smaller than the refractive index of the non-opaque cover plate to avoid total reflection between the optical adhesive and the non-opaque cover plate. The display panel is used for illumination and may be a display panel for displaying an image, such as an OLED panel, and the pixels of the display panel may be elements of an OLED pixel array.

Figure 3:
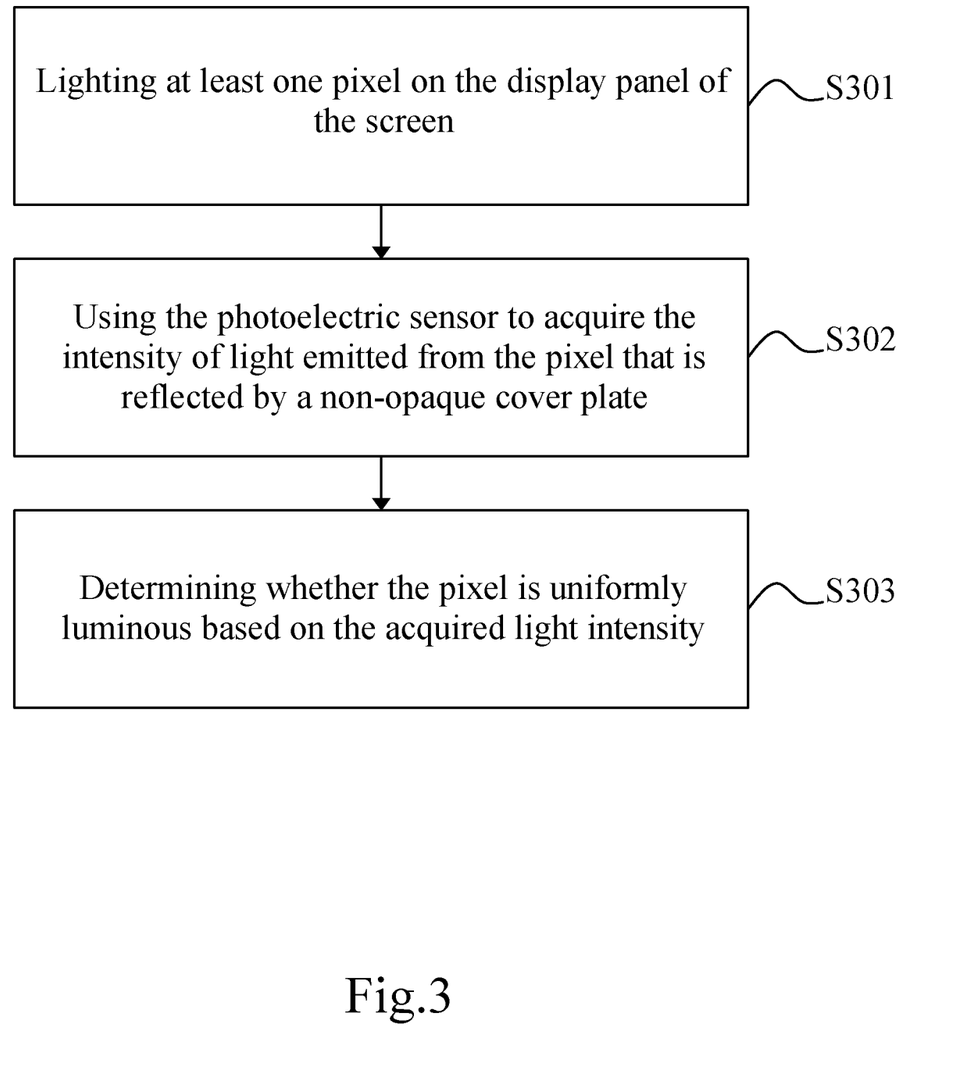
FIG. 3 is a flow chart of a method according to the specific embodiment.

When the above-said screen is under luminance detection, as shown in FIG. 3, the following steps are included. In step S301, at least one pixel on the display panel of the screen is lit. The display panel has multiple pixels, each of which is the smallest unit that can be illuminated on the display panel. In an OLED screen, one pixel may refer to an OLED pixel illumination point, such as a red pixel illumination point. The pixel is driven by a current or voltage. When the pixel is illuminated, it should be driven with a preset current. If multiple pixels are driven, the value of the current for driving each pixel should be the same so as to facilitate subsequent calculations. Then, in step S302, light intensity of the pixel reflected by the non-opaque cover plate of the screen is acquired by the photoelectric sensor of the screen. Most of the light from the pixel passes through the non-opaque cover plate, but some is reflected back by the non-opaque cover plate. As shown in FIG. 3, the light of the pixel O is reflected by point A of the non-opaque cover plate and is incident on a point B of the photoelectric sensor. The reflected light is acquired by the photoelectric sensor, and the light acquired by the photoelectric sensor indicates the illumination state of the pixel. Thereafter, in step S303, whether the pixel is uniformly luminous is determined based on the acquired light intensity. The invention can realize the acquisition of the light of the pixel by adding the photoelectric sensor on the screen to acquire the reflected light of the pixel, thereby determining whether the pixel is uniformly luminous.

Figure 4:
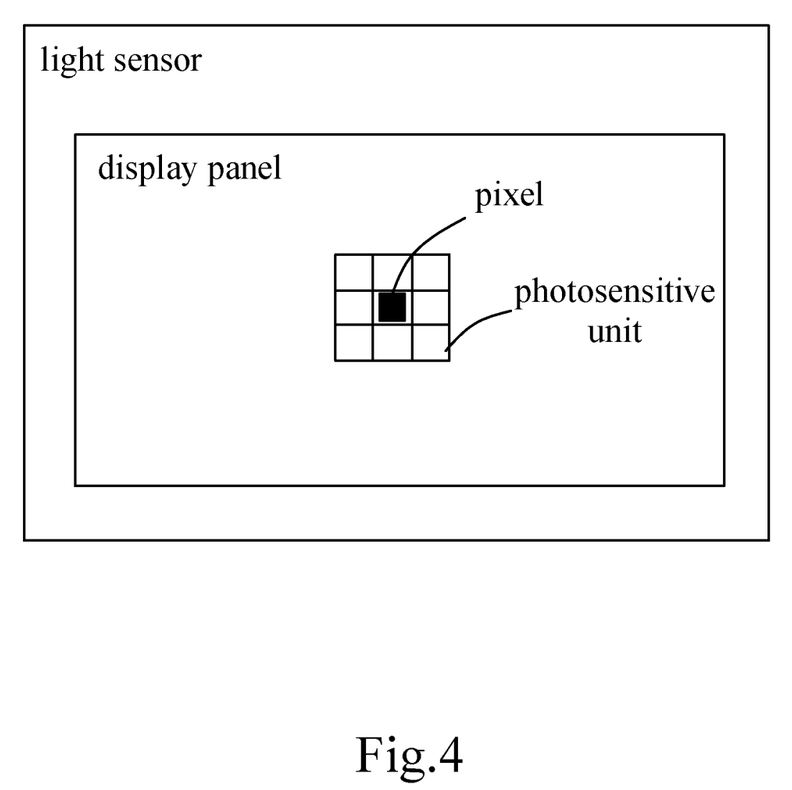
FIG. 4 is a schematic diagram of a position relationship between a pixel and a photoelectric sensor according to the specific embodiment.

According to the acquired light intensity, it is determined whether the pixel is uniformly luminous. Since the pixel of the OLED screen is an organic material, the lifespan is limited, and the degradation occurs over time, resulting in uneven luminance. By comparing the current luminance data with the normal luminance data at the beginning, it is possible to detect whether the pixel is uniformly luminous. The method of the embodiment includes the step S301 of lighting at least one pixel on the display panel of the screen and the step S302 of using the photoelectric sensor of the screen to acquire the light intensity of the pixel reflected by the non-opaque cover plate of the screen. As shown in FIG. 4, the light of the pixel is acquired by the photoelectric sensor. Then, according to the light intensity, the step S303 of determining whether the pixel is uniformly luminous based on the acquired light intensity includes the following steps. First, whether the difference between the acquired light intensity and a pre-stored original light intensity is within a reasonable range is determined. If it is within a reasonable range, the pixel corresponding to the acquired light intensity is uniformly luminous; otherwise, the pixel corresponding to the acquired light intensity is not uniformly luminous. The pre-stored original light intensity is light intensity emitted from an ideal pixel and acquired by the photoelectric sensor, and the ideal pixel is originated from theoretical principle. Or, in some embodiment, the pre-stored original light intensity is intensity data of light emitted from the pixel on a standard screen and acquired by the photoelectric sensor, and the standard screen has just been produced and calibrated so that the pixel thereon is initially uniformly luminous. The original light intensity is pre-stored on the memory of the electronic device having the screen and can be called by a processor when the processor calculates whether the pixel is uniformly luminous. At this time, the current for lighting the pixel should be consistent with the current for lighting pixel when the pre-stored original light intensity is used, thereby realizing the light intensity comparison under the same driving condition.

The difference between the acquired light intensity and the original light intensity is such as the absolute value of the difference between the acquired light intensity and the original light intensity. If the light intensity is acquired only by one photoelectric sensor under the pixel, the difference is the absolute value of subtracting the original light intensity from the acquired light intensity. If the light intensity is acquired by multiple photoelectric sensors under the pixel, the light intensity acquired by the photoelectric sensors is algorithmically calculated to a value (such as directly taking the arithmetic mean value), and then the difference is the absolute value of subtracting the calculated value from the original light intensity. For example, the reasonable range is preset according to actual needs. For example, a constant parameter is preset. If the difference is larger than the parameter, the pixel is not uniformly luminous. Or, if the parameter is a light intensity and the difference is larger than the light intensity, the pixel is not uniformly luminous. In some embodiments requiring high display quality, the parameter may be 0, and the pixel is uniformly luminous if the difference between the acquired light intensity and the pre-stored original light intensity is 0, otherwise the pixel is not uniformly luminous. In some embodiments, the reasonable range is changeable according to the screen usage time, such as linearly increasing according to the screen usage time, so that after the screen is used for a period of time, the allowed reasonable range is larger, to avoid detecting too many uneven luminous pixels, and reduce the workload that needs to compensate for too many pixels in a later step.

Determining whether the pixel is uniformly luminous based on the acquired light intensity is performed such as by comparison with the pre-stored original light intensity as above described or by comparison with other pixel. The method in the invention includes the step S301 of lighting at least one pixel on the display panel of the screen and the step S302 of using the photoelectric sensor of the screen to acquire the intensity of light emitted from the pixel that is reflected by the non-opaque cover plate of the screen. Then, according to the light intensity, the step S303 of determining whether the pixel is uniformly luminous based on the acquired light intensity includes the following steps. First, whether the difference between the acquired light intensity and light intensity from other pixel is within a reasonable range is determined. If it is within a reasonable range, the pixel corresponding to the acquired light intensity is uniformly luminous; otherwise, the pixel corresponding to the light intensity is not uniformly luminous. The number of other pixels is one or multiple. If it is multiple, the light intensity of the other pixels is average of summing the light intensity of each pixel. Here, the meaning of difference and the reasonable range are referred to the embodiment of the pre-stored original light intensity, and the similar approaches are adopted in this embodiment.

There are a large number of pixels on the display panel, and it takes a long time to light the pixels one by one. In order to improve lighting and detection efficiency, the step S301 of lighting at least one pixel on the display panel of the screen includes the step of driving the pixels on display panel of the screen with a preset pattern. The preset pattern is pre-stored in the memory, and the processor directly calls the preset pattern to drive the screen. In order to light a single pixel, the pattern color of the preset pattern may be pure red, blue, green, or the like. The number of the preset patterns is such as multiple, and the processor lights the display panel multiple times for light acquisition and calculation. The pixels in image blocks corresponding to the preset patterns will be lit, and the pixels in blank areas between the image blocks will not be lit. Each image block is corresponding to one pixel or multiple pixels. In order to reduce the mutual influence between the image blocks, the blank area between image blocks should be relatively large, so that the effect caused by the light of the image block on the acquisition of the light intensity of the adjacent image block is in a negligible range. The negligible range includes the conditions that the photoelectric sensors corresponding to one image block cannot acquire the light of the adjacent image block, or that the ratio of the acquired light intensity of the adjacent image block to the acquired light intensity of the corresponding image block is less than the threshold.

Figure 5:
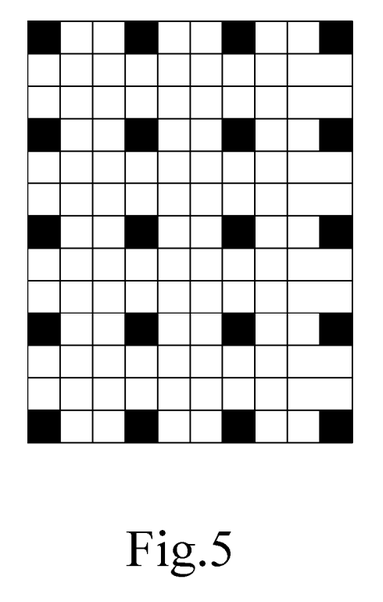
FIG. 5 is a schematic diagram of multiple pixels arranged in a spaced array according to the specific embodiment.
Figure 6:
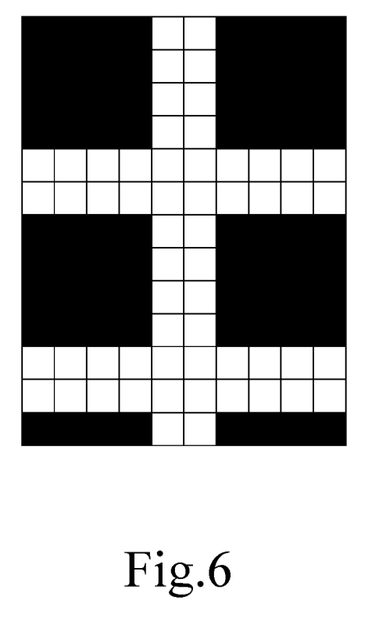
FIG. 6 is a schematic diagram showing the arrangement of lighting multiple pixels according to the specific embodiment.

In order to improve lighting and detection efficiency, the pixels are arranged in a spaced array or the aggregated multiple pixels are lit at a time. The step S301 of lighting at least one pixel on the display panel of the screen includes the step of lighting multiple pixels on the display panel of the screen, the multiple pixels are arranged in a spaced array as shown in FIG. 5. Or, the step S301 of lighting at least one pixel on the display panel of the screen includes the step of lighting multiple pixels on the display panel of the screen, the multiple pixels are arranged in an aggregated manner, in other words some of the multiple pixels are adjacent in some embodiment, and each region of the aggregated pixels in FIG. 6 includes 4×4=16 pixels. In this way, lighting and detecting multiple pixels are realized each time, and the detection efficiency is improved. Of course, when multiple pixels are lit, the light intensity reflects the condition of multiple pixels. Or it may be a plurality of sets of aggregated pixels, and each set of aggregated pixels is arranged in a spaced array, as shown in FIG. 6.

Figure 7A:
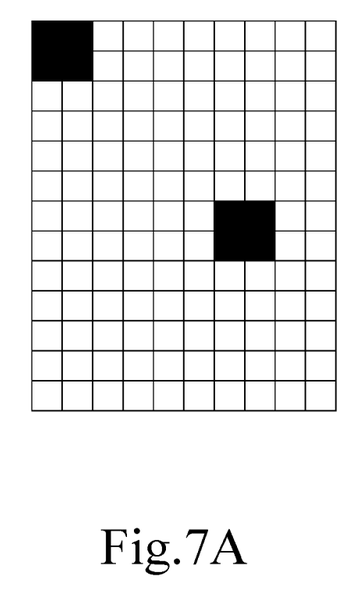
FIG. 7A is a schematic diagram of an arrangement of lighting multiple pixels after the number of pixels is reduced according to the specific embodiment.
Figure 7B:
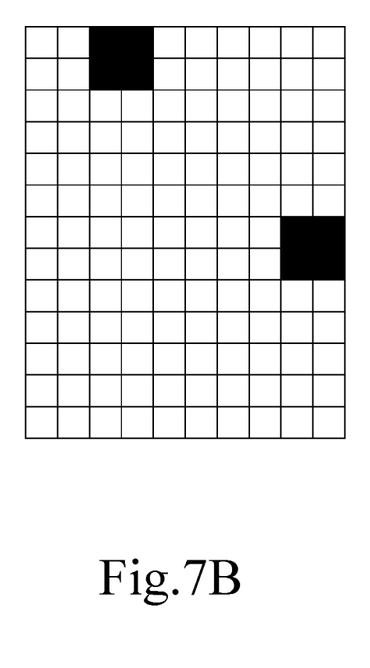
FIG. 7B is another schematic diagram of lighting multiple pixels after the number of pixels is reduced according to the specific embodiment.
Figure 8:
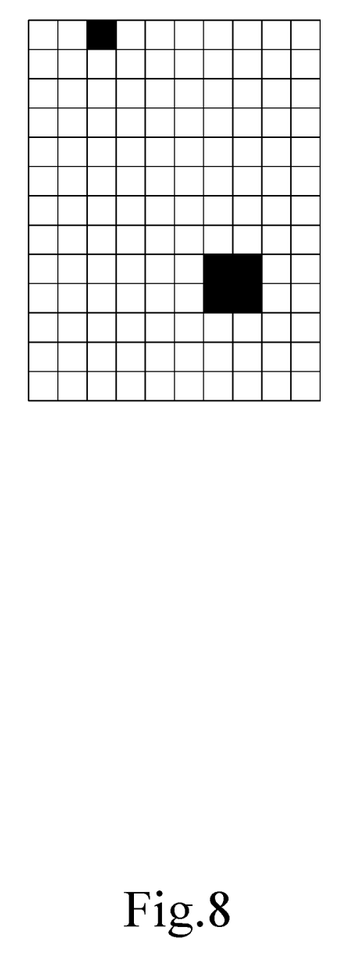
FIG. 8 is a schematic diagram of an arrangement of lighting multiple pixels after the number of pixels is reduced again according to the specific embodiment.

When multiple pixels are lit each time, the condition of multiple pixels is acquired. To acquire a condition of a pixel, the number of the multiple pixels can be sequentially reduced and lit, and light intensity of the pixel is acquired until one pixel not uniformly luminous is found. Specifically, as shown in FIG. 6, FIG. 7A, FIG. 7B, and FIG. 8, after the plurality of regions of aggregated pixels is lit for the first time in FIG. 6, the light intensity acquired by the sensor determines the upper left and the middle right regions of the pixels are not uniformly luminous. Then, when the pixels are lit next time, only the upper left portion of the pixels in the upper left and the middle right regions are lit. If the light intensity is acquired and calculated and that the pixels are uniformly luminous is determined, the other pixels are sequentially illuminated, and the pixels in the upper right portion are lit again as shown in FIG. 7B. If it is determined that the upper right portion of the upper left region is not uniformly luminous, the number of lit pixels is reduced again until a pixel that is not uniformly luminous is found.

As mentioned above, the intensity of light emitted from one pixel can be acquired by a photoelectric sensor or by multiple photoelectric sensors, the intensity of light emitted from multiple pixels can also be acquired by a photoelectric sensor or by multiple photoelectric sensors. If the number of the photoelectric sensors is multiple, the step S302 of using the photoelectric sensor of the screen to acquire the intensity of light emitted from the pixel that is reflected by the non-opaque cover plate of the screen includes a step of using multiple photoelectric sensors corresponding to the lit pixels to acquire the intensity of light emitted from the pixels that is reflected by the non-opaque cover plate of the screen. The number of photoelectric sensors is preset in the memory of the electronic device, and the multiple photoelectric sensors is arranged around the pixels, as shown in FIG. 4. Acquiring light intensity through multiple photoelectric sensors can better reflect the luminance of the pixels and avoid possible errors caused by one photoelectric sensor.

Figure 9:
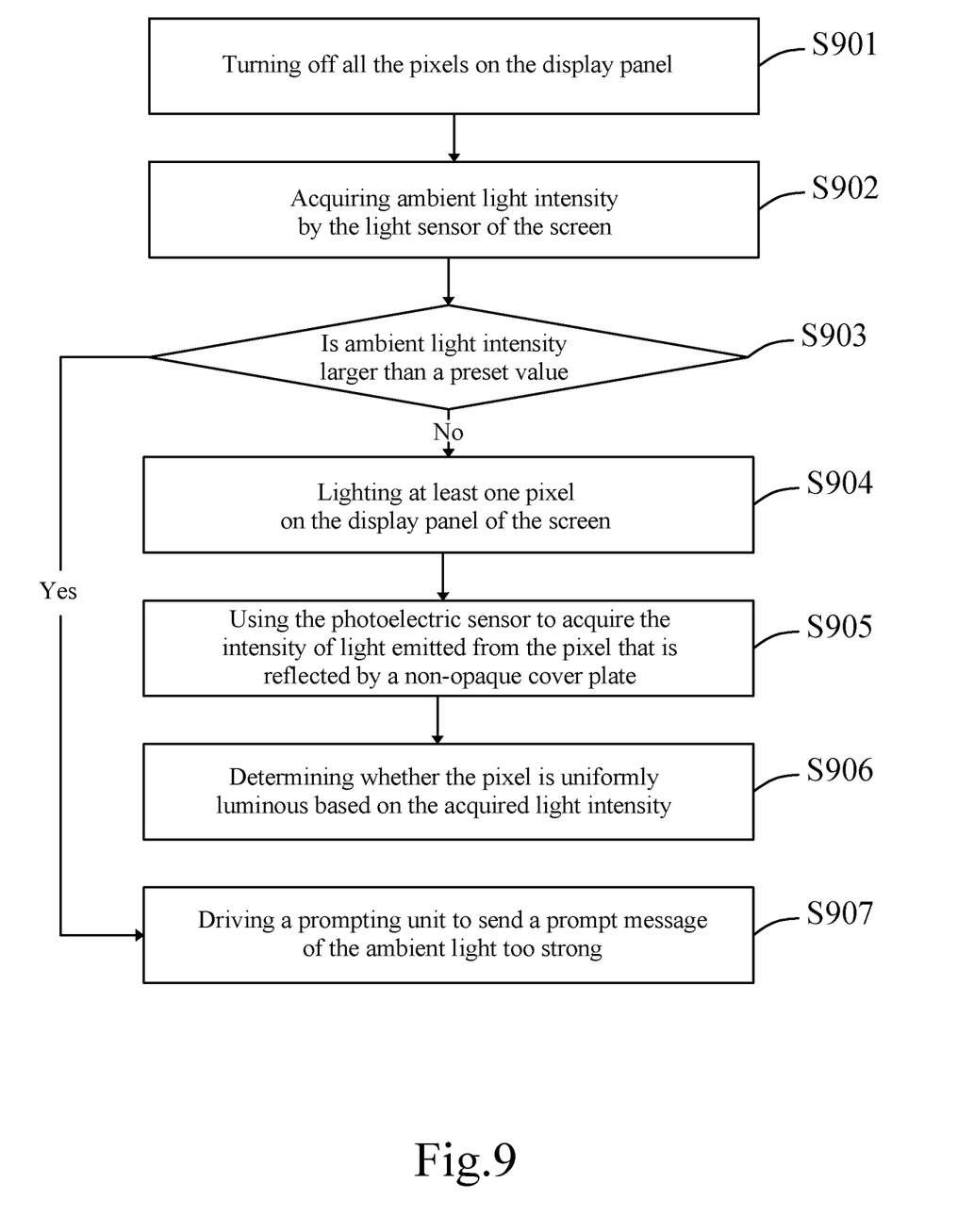
FIG. 9 is a flow chart of determining ambient light according to the specific embodiment.

When the photoelectric sensor acquires the light intensity, the ambient light outside the screen of the electronic device may also enter the screen and be acquired by the photoelectric sensor, thereby affecting the light intensity acquiring accuracy of the photoelectric sensor. In order to avoid the influence of excessive ambient light, as shown in FIG. 9, before the step S904 of lighting at least one pixel on the display panel of the screen the method further includes the following steps. In step S901, all the pixels on the display panel are turned off; that is, the display panel is in a non-illuminating state, so that ambient light can be acquired. Then, in step S902, ambient light intensity is acquired by the photoelectric sensor of the screen. In step S903, whether the ambient light intensity is larger than a preset value is determined. If the ambient light intensity is larger than the preset value, the step of lighting at least one pixel on the display panel of the screen is not performed, and the method of the invention ends. Otherwise, the ambient light intensity is less than or equal to the preset value, and then step S904 is performed to light at least one pixel on the display panel of the screen. Step S905 and step S906 are then be performed and steps S904-S906 are the same as steps S301 to S303. By determining the ambient light intensity, it is possible to avoid acquiring the light intensity when the ambient light intensity is too strong and avoid acquiring erroneous data.

In the invention, when the light intensity is acquired, the screen of the electronic device should be in a dark environment. If the electronic device is a mobile phone, the user can put the mobile phone in his pocket and not expose the screen to the ambient light. If the electronic device is a laptop, you can close the laptop display. When the luminance detection of the pixel is performed and the ambient light intensity is larger than the preset value, the method of the invention further includes step S907 of driving a prompting unit to send a prompt message of the ambient light too strong. The prompting unit is such as a vibration unit, a sound unit or a display unit, and the prompt message is such as vibration, playing a prompt sound or displaying prompt information. By the prompting message, the user knows that the current ambient light is too strong, so that the user can reduce the ambient light intensity outside the screen, and then the step of acquiring the light intensity of the pixels and the step pf calculating and determining whether the pixels are uniformly luminous are performed.

Figure 10:
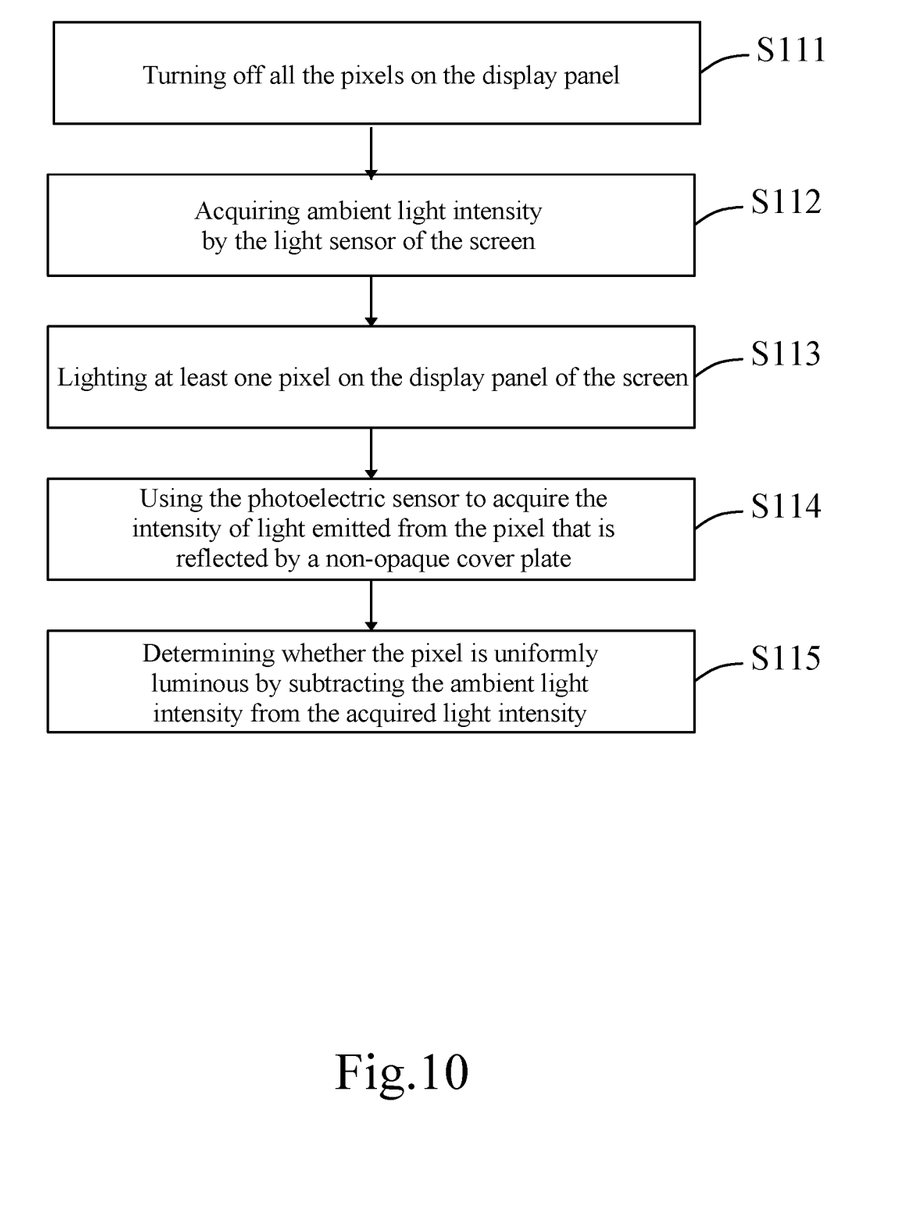
FIG. 10 is a flow chart of eliminating ambient light effects according to the specific embodiment.

In order to eliminate interference from the ambient light, before the step of lighting at least one pixel on the display panel the method further includes the following steps. In step S111, all the pixels on the display panel are turned off. Then, in step S902, the ambient light intensity is acquired by the photoelectric sensor of the screen. Then, in step S113, at least one pixel on the display panel of the screen is lit. In step S114, the light intensity of the pixel reflected by the non-opaque cover plate of the screen is acquired by the photoelectric sensor of the screen. Thereafter, in step S115, whether the pixel is uniformly luminous is determined by subtracting the ambient light intensity from the acquired light intensity. Of course, in some embodiments, the ambient light intensity cannot be too strong. In the above embodiment, if the ambient light intensity is too strong, the prompt message is still sent to the user, and then the operation of acquiring light of the pixel is performed after the ambient light intensity meets the requirements.

When the existing pixels are unevenly illuminated, an afterimage is formed on the screen, affecting the user's viewing experience. Since these areas can be seen by the user, these areas can be detected and compensated for point by point. The step of lighting at least one pixel on the display panel of the screen includes the step of acquiring a touched area of the touch screen and lighting at least one pixel corresponding to the touched area on the display panel of the screen. Of course, if there are multiple pixels in the touched area, the pixels can be illuminated one by one to acquire light and determine whether they are uniformly luminous. The touch area is a point or an area touched on the screen, and the pixel is one pixel corresponding to the touch point or a plurality of pixels corresponding to the touch area. The correspondence between the pixel and the touch area can be set in advance. For example, a circle of a set length is drawn with the pixel corresponding to and directly under the touch point or touch area as a center, and then the pixels in the circle are sequentially illuminated and the light intensity is acquired to calculate whether the light is uniformly luminous. For the light acquisition of multiple pixels, the above-mentioned light acquisition of multiple pixels can also be taken firstly, and then the number of illuminated pixels is reduced, and the acquisition is again performed until the light of a single pixel is acquired.

For current screen in the art, the illumination thereof is usually regulated by controlling the current or voltage. For pixels that are not uniformly luminous, the illumination of the pixels can be compensated by changing the voltage or current thereof. The method of the invention further includes a step: when it is determined that the pixel is not uniformly luminous based on the light intensity, the driving current or voltage of the pixel is changed according to a preset compensation rule so that the pixel is uniformly luminous. The compensation rule is the relationship between the difference in light intensity and the need to adjust the current or voltage. The specific compensation principle is: taking the current as an example, the pixel has a corresponding relationship between the current and the light intensity. This relationship can be established by driving the pixel with different currents to acquire the light intensity. When the acquired light intensity driven by an original light intensity is stronger than the original light intensity corresponding to the original current, the driving current is reduced during the compensation, and the compensation value is a negative number; when the acquired light intensity is lower than the original light intensity, the driving current is raised during the compensation, and the compensation value is a positive number. The magnitude of the current to be compensated for, i.e. compensation value, by different difference may be preset in the memory, and then the current of the uneven illuminated pixel is adjusted by the corresponding relationship, so that the pixel can be uniformly luminous.

For current displaying screen in the art, it has its own driver chip and the driver chip stores driving parameters. The step of changing the driving current or voltage of the pixel to make the pixel illuminate uniformly includes a step of changing the driving parameters of the screen to make the pixel illuminate uniformly. The driving parameter includes a compensation value of the driving current or voltage of each pixel, and the compensation value is added each time the pixel is driven, so that the pixel can be uniformly luminous.

Figure 11:
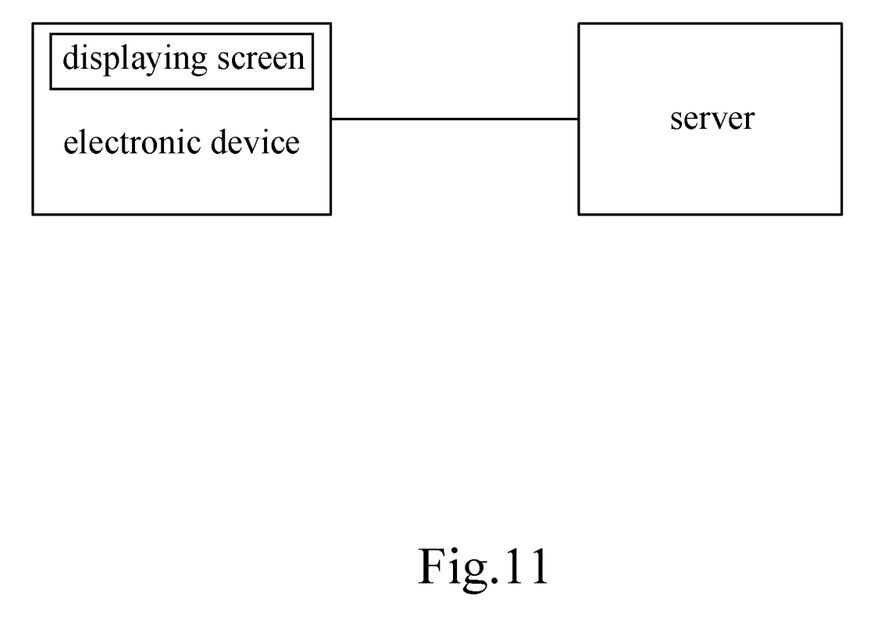
FIG. 11 is architecture diagram of a system having a server according to the specific embodiment.
Figure 12:
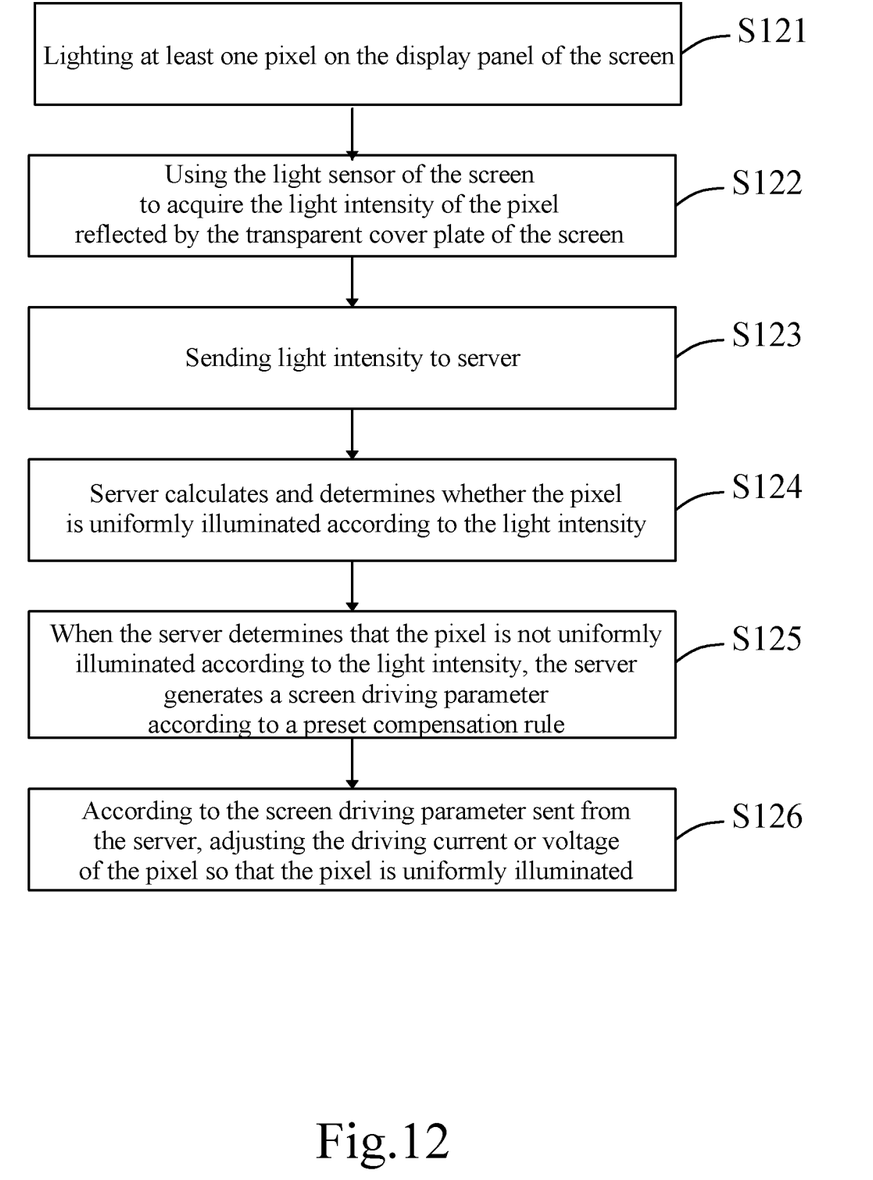
FIG. 12 is a flow chart of a method with a server according to the specific embodiment.

In the above embodiment, the preset values, the compensation rules, and the like may be set on the memory. That is, the method of the instant invention can be run on an electronic device alone, thus requiring a large storage space. There are many displaying screen signals in the art, and the compensation rules are different for different displaying screens. In this embodiment, it can be performed by means of a server, and its hardware structure is as shown in FIG. 11. The steps of the method of the invention are as shown in FIG. 12 and described in the following. In a step S121, at least one pixel on the display panel of the screen is lit. In a step S122, the light intensity of the pixel reflected by the non-opaque cover plate of the screen is acquired by the photoelectric sensor of the screen. In a step S123, the light intensity is sent to the server, and in a step S124 the server calculates and determines whether the pixel is uniformly luminous according to the light intensity. In a step S125, when the server determines that the pixel is not uniformly luminous according to the light intensity, the server generates a screen driving parameter according to a preset compensation rule. Then, in a step S126, according to the screen driving parameter sent from the server, the driving current or voltage of the pixel is adjusted so that the pixel is uniformly luminous. The server is such as another electronic device having processing and communication functions and can process data and exchange information with the electronic device. The compensation rules on the server can be the same as those on the electronic device. By the processing of the server, the processing efficiency is improved, and the processing time required for electronic devices and the capacity requirements of the required storage are reduced.

In some embodiments, the parameters sent by the electronic device to the server may also include the model number of the screen. In this way, for different screen signals, the server can perform different operations according to the screen model number and the received light intensity, and give different compensation values, so that different screens can be complemented, and the user does not need to care about the model number of the screen of the used electronic device.

As mentioned above, the screen of the instant invention can also be used to acquire on-screen images such as fingerprints. Then, when acquiring the fingerprint image, the instant invention further includes the following steps. An object is placed on the non-opaque cover plate. In order to acquire the object, the object should have biological characteristics such as fingerprints and palm prints. Then the pixel of the display panel is lit. Then, light of the pixel totally reflected by the non-opaque cover plate is acquired by the photoelectric sensor, and the display panel and the photoelectric sensor are disposed under the non-opaque cover plate. The position of pixel to be lit is shifted every preset time interval, the step of lighting the pixel and the step of acquiring the light are repeated. After performing the above steps for a preset number of times, the image data of the object is acquired by stitching according to the light data acquired by the photoelectric sensor. The imaging principle of total reflection is that when imaging, the finger is in contact with the non-opaque cover plate, and there is air in the concave portions of the fingerprint, and the light whose incident angle exceeds the critical angle of total reflection forms total reflection, and the photoelectric sensor acquires more light; but the convex portion of the fingerprint is in contact with the upper surface of the non-opaque cover plate, and the light does not generate total reflection, and the photoelectric sensor acquires less light, so that the image of the fingerprint can be distinguished. If a point on the glass cover plate pressed by the finger is to be imaged onto the surface of the photoelectric sensor, the light emitted by the light-emitting point on the light-emitting layer just meets the needs according to the total reflection condition. Imaging in a single time can only acquire part of the image and cannot seamlessly scan the entire fingerprint. If multiple position shifts and light acquisitions are required to complete the acquisition of the images, and then the acquired images will be stitched to get a entire fingerprint image.

Because the space under the screen is very small, the range of illumination of a single point light source is also small, and multiple discrete point light sources must be used to illuminate the fingers in parallel to meet the requirements of rapid under-screen fingerprint imaging. However, each point light source forms an image (not total reflection imaging) on the sensor directly below, and the fingerprint directly above the point light source is not able to achieve total reflection imaging because the incident angle of the light is less than the critical angle, and the fingerprint image is missing. Although multiple pixels can form a point light source and simultaneously illuminating the fingerprint, a single scan still cannot seamlessly scan the entire fingerprint. The traditional fingerprint scanning mainly uses the method of stitching corresponding same part to connect the small piece of fingerprint information. This method cannot solve the phenomenon of partial area enlargement in the image. At the same time, if the existing scanning methods, "progressive scanning" and "interlaced scanning" methods, are used, only one row or one column of information can be acquired at a time, and the acquired information is very limited, which cannot satisfy the requirement of rapid acquisition of the complete image based on the point light source array. If multiple point light source arrays that are too dense are used, the point light source array can complement each other, so that the entire fingerprint scanning can be realized, but the fingerprint image acquired by illumination of each point light source array may overlap, and the subsequent processing is very difficult. In order to avoid overlap, the point light source spacing of the instant invention satisfies the condition that the images do not overlap, but some part of the fingerprint image will be missing. In order to acquire a complete fingerprint image, the instant invention uses a time division multiplexing technique to achieve entire coverage of the fingerprint image.

Specifically, the method includes the following steps. An object is placed above the non-opaque cover plate, pixels in multiple discrete point light source regions of the display panel are lit, and the point light source regions are arranged in an array and are separated by non-illuminating pixels. Light of the pixel totally reflected by the non-opaque cover plate is acquired by the photoelectric sensor, and the display panel and the photoelectric sensor are disposed under the non-opaque cover plate. Thereafter, after performing the same position shift for all point light source regions in a preset time interval, the step of lighting the pixel and the step of acquiring the light are repeated. After performing the above steps for a preset number of times, the image data of the object is acquired by stitching according to the light data acquired by the photoelectric sensor. By simultaneously lighting multiple point light source regions, a large amount of image information can be acquired each time. Then, by multiple position shifts of the pixels to be lit, the light data including all the under-screen images can be acquired, and finally the image corresponding to the light data is stitched to acquire the complete image data.

In practical applications, to achieve image stitching, it is necessary to preprocess the acquired light image data each time. The acquired image data is scaled, the invalid image data is removed, and the effective image area of acquired light data each time is acquired. Then, the complete image data can be got by stitching the effective image areas. The stitching is generally done by overlapping the same portions of the image area to achieve extension of different image areas until the entire image is obtained. And executing the steps for the preset number of times is generally to determine whether the preset number of times has been reached after each step ends, and generally before the position shift to avoid useless position shift.

The position shift is to obtain missing image information. In order to facilitate subsequent image stitching, the distance of each position shift is equal. And the preferred shifted direction is that the point light source is shifted toward the adjacent point light source. The distance of the position shift is an integer fraction of the distance between adjacent point light sources. For example, the distance of each position shift is one-third or one-eighth of the distance between the centers of adjacent point light sources. In this way, the image data between the point light sources can be acquired at equal intervals, and the image stitching algorithm can adopt the same algorithm, so that the processing efficiency is higher. Thus, the instant invention can achieve efficient acquisition of fingerprint images while achieving luminance detection.

The instant invention also provides a storage medium storing a computer program that implements the steps of the above method when executed by a processor. The storage medium of the embodiment may be a storage medium provided in the electronic device, and the electronic device can read the content of the storage medium and achieve the effects of the instant invention. The storage medium can also be a separate storage medium that is coupled to the electronic device, and the electronic device can read the contents of the storage medium and implement the steps of the methods of the instant invention.

The instant invention provides an electronic device including a memory and a processor, the computer programs is stored on the memory. The computer programs are executed by the processor to implement the steps of any of the methods described above. Although the above embodiments have been described, those skilled in the art can make other changes and modifications to these embodiments once they have learned the basic inventive concept. Therefore, the above descriptions are only the embodiments of the present invention, and thus does not limit the patent protective scope of the present invention. Similarly, any equivalent structure or equivalent process transformation made by using the present specification and the drawings, or directly or indirectly applied to other relevant technical fields, shall be included in the patent protective scope of the present invention.

What is claimed is:

1. A method for detecting luminance uniformity of a screen, comprising:
   lighting at least one pixel on a display panel of a screen;
   acquiring, by a photoelectric sensor, intensity of light emitted from the at least one pixel that is reflected by a non-opaque cover plate; and
   determining whether the at least one pixel is uniformly luminous based on the acquired light intensity;
   wherein, determining whether the pixel is uniformly luminous based on the acquired light intensity comprises:
   determining whether a difference between the acquired light intensity of the at least one pixel and a light intensity of other pixel is within a reasonable range;

if the difference is within the reasonable range, determining the at least one pixel corresponding to the light intensity is uniformly luminous;

otherwise determining the at least one pixel corresponding to the acquired light intensity is not uniformly luminous.

2. The method for detecting luminance uniformity of a screen according to claim 1, characterized in that, lighting at least one pixel on a display panel of a screen comprises:
driving the pixels on the display panel of the screen to emit light according to a preset pattern.

3. The method for detecting luminance uniformity of a screen according to claim 1, characterized in that, lighting at least one pixel on a display panel of a screen comprises a step of:
lighting multiple pixels on the display panel of the screen, wherein the multiple pixels are arranged in a spaced array.

4. The method for detecting luminance uniformity of a screen according to claim 1, characterized in that, lighting at least one pixel on a display panel of a screen comprises:
lighting multiple pixels on the display panel of the screen, wherein some of the multiple pixels are arranged in an aggregated manner.

5. The method for detecting luminance uniformity of a screen according to claim 1, characterized in that, the method further comprises:
when it is determined that the at least one pixel is not uniformly luminous based the acquired light intensity,
sequentially reducing the number of the multiple pixels that is luminous, and acquiring light intensity of the reduced pixels until a pixel that is not uniformly luminous is found.

6. The method for detecting luminance uniformity of a screen according to claim 1, characterized in that, acquiring light intensity of the pixel reflected by a non-opaque cover plate by a photoelectric sensor of the screen comprises:
using multiple photoelectric sensors corresponding to the lit pixels to acquire the light intensity of the pixels reflected by the non-opaque cover plate of the screen.

7. The method for detecting luminance uniformity of a screen according to claim 1, characterized in that, before lighting the at least one pixel on the display panel of the screen the method further comprises:
turning off all the pixels on the display panel;
acquiring an ambient light intensity by the photoelectric sensor of the screen;
determining whether the ambient light intensity is larger than a preset value;
lighting the at least one pixel on the display panel of the screen if the ambient light intensity is less than or equal to the preset value.

8. The method for detecting luminance uniformity of a screen according to claim 7, characterized in that, when the ambient light intensity is larger than the preset value the method further comprises:
driving a prompting unit to send a prompt message of the ambient light being too strong.

9. The method for detecting luminance uniformity of a screen according to claim 1, characterized in that,
before lighting at least one pixel on the display panel of the screen the method further comprises:
turning off all the pixels on the display panel, acquiring ambient light intensity by the photoelectric sensor of the screen; and
determining whether the pixel is uniformly luminous based on the light intensity comprises:

determining whether the pixel is uniformly luminous by subtracting the ambient light intensity from the acquired light intensity.

10. The method for detecting luminance uniformity of a screen according to claim 1, characterized in that, lighting at least one pixel on the display panel of the screen comprises:
acquiring a touched area of a touch screen;
lighting at least one pixel corresponding to the touched area on the display panel of the screen.

11. The method for detecting luminance uniformity of a screen according to claim 1, characterized in that, the method further comprises a step of:
when it is determined that the pixel is not uniformly luminous based on the acquired light intensity,
changing a driving current or voltage of the pixel according to a preset compensation rule so that the pixel is uniformly luminous.

12. The method for detecting luminance uniformity of a screen according to claim 11, characterized in that, changing driving current or voltage of the pixel according to a preset compensation rule so that the pixel is uniformly luminous comprises:
changing driving parameters of the screen to make the pixel illuminate uniformly.

13. The method for detecting luminance uniformity of a screen according to claim 11, characterized in that,
the step of "when it is determined that the pixel is not uniformly luminous based on the acquired light intensity, changing driving current or voltage of the pixel according to a preset compensation rule so that the pixel is uniformly luminous" comprises:
sending the light intensity to a server;
calculating and determining, by the server, whether the pixel is uniformly luminous based on the light intensity;
generating, by the server, a screen driving parameter according to a preset compensation rule when the server determines that the pixel is not uniformly luminous based on the acquired light intensity;
receiving, from the server, the screen driving parameter to adjust the driving current or voltage of the pixel so that the pixel is uniformly luminous.

14. The method for detecting luminance uniformity of a screen according to claim 1, characterized in that, the method further comprises steps of:
placing an object on the non-opaque cover plate;
lighting at least one pixel of the display panel;
acquiring light of the pixel totally reflected by the non-opaque cover plate by the photoelectric sensor, wherein the display panel and the photoelectric sensor are disposed under the non-opaque cover plate;
shifting position of the at least one pixel to be lit in a preset time interval, repeating the step of lighting the pixel and the step of acquiring the light intensity;
after performing the above steps for a preset number of times, stitching the light intensity acquired by the photoelectric sensor to acquire an image data of the object.

15. The method for detecting luminance uniformity of a screen according to claim 14, characterized in that:
the pixels are pixels in multiple discrete point light source regions, and the point light source regions are arranged in an array and are separated by non-illuminating pixels;

the step of shifting position of the at least one pixel to be lit comprises a step of performing the same position shift for all point light source regions in a preset time interval.

16. The method for detecting luminance uniformity of a screen according to claim 14, characterized in that, the object has biological characteristics.

17. A storage medium, characterized in that, the storage medium stores a computer program and the computer program is executed by a processor to implement the steps of the method of claim 1.

18. An electronic device, comprising a memory and a processor, wherein a computer program is stored on the memory, the computer program being executed by the processor to implement the steps of the method of claim 1.

* * * * *